United States Patent Office 3,335,095
Patented Aug. 8, 1967

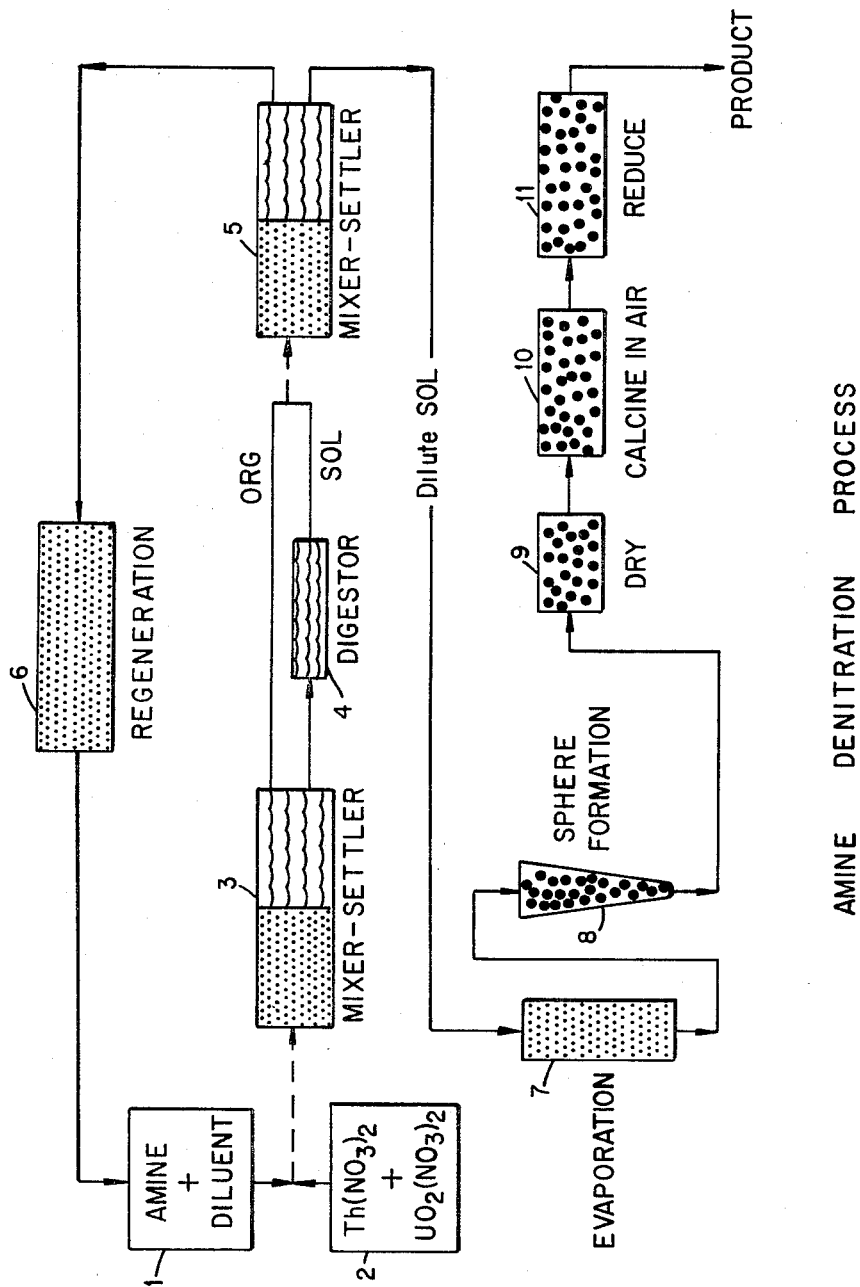

3,335,095
PREPARATION OF ACTINIDE SOLS BY AMINE EXTRACTION
John G. Moore, Clinton, Tenn., assignor to the United States of America as represented by the United States Atomic Energy Commission
Filed Jan. 31, 1967, Ser. No. 613,048
8 Claims. (Cl. 252—301.1)

ABSTRACT OF THE DISCLOSURE

A process for preparing an actinide sol from an actinide nitrate solution by extracting a portion of the nitrate from the aqueous solution with an amine, digesting the resulting aqueous phase at a temperature of 80° to 100° C. for at least six minutes to convert additional nitrate to an amine-extractable form and then extracting additional nitrate from the digested solution with an amine.

BACKGROUND OF THE INVENTION

The invention described herein was made in the course of, or under, a contract with the United States Atomic Energy Commission.

My invention relates to methods of making actinide sols from aqueous actinide nitrate solutions and more specifically to liquid-liquid extraction methods of making such sols.

In sol-gel processes for making actinide oxide or actinide carbide particles useful as a nuclear reactor fuel, an aqueous actinide nitrate solution is denitrated to an optimum nitrate content, the resulting solution is heated to provide an aquasol, and the sol is dehydrated to form a gel which is dried and fired. In the step of making the sol the nitrate content is critical. An insufficient amount of nitrate in this step results in a final product having an undesirably low density, while too much nitrate produces an unstable sol, flocculation of crystallites, and a low-density final product. The mol-ratio of nitrate to actinide may range from 0.04 to 0.4, depending on the specific actinide involved and on the size and aggregation of particles making up the sol. For preparing plutonium sols the ratio can be as high as 0.4, while thorium-containing sols require a ratio less than 0.25.

Methods of denitration have included thermal decomposition, steam denitration, precipitation of the actinide values followed by partial removal of the soluble nitrates by washing, and extraction of nitrate values from the aqueous solution with amines. Inasmuch as liquid-liquid extraction processes are amenable to remote operation and to continuous processing, removal of nitrate by extraction with amines appears to be attractive; however, the desired low nitrate concentration has not been achieved in previous attempts to extract nitrate from actinide nitrate solutions. Stable emulsions are formed and the nitrate content remains at a relatively constant value, which is too high for stable sol formation, even with repeated contact with the amine extractant. Attempts have been made to increase the nitrate extraction by digesting the organic and aqueous mixture at about 90° C.; however, under these conditions there is amine degradation, and the uranium-to-thorium molar ratio is limited to a relatively low value, i.e., below about 1:10.

SUMMARY OF THE INVENTION

It is accordingly one object of my invention to provide an improved method of preparing an actinide sol from actinide nitrate solutions.

It is another object to provide a liquid-liquid extraction method of converting an aqueous actinide nitrate solution into a sol suitable for use in sol-gel processes for making actinide oxide or carbide particles.

It is another object to provide a method of making a thorium-uranyl sol having a uranium-to-thorium molar ratio substantially greater than 1:10.

Other objects of my invention will be apparent from the following description and the attached claims.

In accordance with my invention I have provided a method of making an actinide sol from an aqueous actinide nitrate solution comprising reducing the nitrate content in said solution to a substoichiometric amount, digesting the resulting aqueous solution at an elevated temperature, contacting the resulting digested solution with an organic solution of an amine, and separating the resulting nitrate-containing organic phase from the resulting nitrate-depleted aqueous solution.

The step of digesting an actinide nitrate containing less than a stoichiometric amount of nitrate unexpectedly converts a portion of the nitrate into a form which can be extracted by the amine. The succeeding amine extraction step thus reduces the nitrate content to a level suitable for sol-gel methods of making actinide oxides or actinide carbides. It is critical that a step of removing nitrate precedes this heating or digestion step. A heating step has no apparent beneficial effect, as far as amine extraction of nitrate is concerned, on an aqueous solution containing a stoichiometric quantity of nitrate.

Another unexpected feature of my process is the ability to make stable sols containing a high concentration of uranyl values.

BRIEF DESCRIPTION OF THE DRAWING

The figure of the attached drawing is a flowsheet of a process of making thoria-urania particles incorporating my method of forming a sol. In accordance with this flowsheet, an amine dissolved in an organic solvent 1 is contacted with an aqueous solution of thorium nitrate and uranyl nitrate 2 in contactor 3. The resulting organic phase containing a portion of the nitrate is separated from the aqueous phase which is sent to digestor 4 where a sol is formed. The aqueous phase is then mixed with the organic phase in contactor 5 where additional nitrate is extracted. The phases are again separated.

If necessary, the aqueous phase is digested again and then contacted again with an organic solution of an amine. The need for additional digestion and extraction steps depends upon the effectiveness of the contacting and heating equipment and upon the thorium-to-uranium ratio. The nitrate is more difficult to remove from a solution containing a high ratio of thorium than from a solution containing a low ratio of thorium.

The organic solution containing the nitrate salt of the amine is sent to a regenerator 6, and then recycled. The dilute sol is concentrated in evaporator 7, contacted with an organic drying agent in column 8 to form gelled spheres which are moved through drier 9, sent to calciner 10, and then are contacted with a reducing atmosphere in vessel 11 to form the desired product. The steps of treating the dilute sol following contactor 5 do not form a part of my invention, the complete flowsheet of the process being given merely to show how my invention fits into a sol-gel process. More details on these and other aspects of a sol-gel process may be found in U.S. Patent No. 3,290,122, issued Dec. 6, 1966, in the names of Sam D. Clinton, Paul A. Haas, George J. Hirth, and Alfred T. Kleinsteuber for "Process for Preparing Oxide Gel Microspheres From Sols."

DESCRIPTION OF THE PREFERRED EMBODIMENTS

Considering my invention in more detail, in the first step the nitrate-to-metal ratio in the aqueous solution is reduced by removal of a portion of the nitrate and in the preferred method of carrying out this step the aqueous actinide nitrate solution is contacted with an organic solution of an amine. It is obvious that my process will work regardless of the method of making the aqueous solution substoichiometric with respect to nitrate; however, the full benefit of my process, i.e., a simple process of making a sol well-suited for remote operation, is not achieved unless the aqueous phase is initially made nitrate-deficient by an amine extraction step.

The actinide values in the aqueous phase to be denitrated may consist essentially of thorium nitrate, or the aqueous solution may also contain uranyl or plutonyl values together with the thorium values. My method may be used with any mixture of actinide nitrates, and, unexpectedly, mixtures containing high molar ratios of uranyl to thorium may be treated. Previous processes of making actinide sols were limited to a maximum uranyl-to-thorium molar ratio of about 1:10. In my process ratios of uranyl to thorium values of at least as high as 2:1 may be used.

The total concentration of these actinide values is not critical; however, a concentration greater than 0.6 molar usually results in the formation of solids during the extraction step. Although these solids may be liquefied upon heating, they could be a source of trouble in remote operations, so in the preferred method of carrying out my invention an actinide concentration of less than 0.6 molar is used.

The organic phase comprises an amine and an organic solvent. The amine may be any water-insoluble primary, secondary, or tertiary amine capable of forming complexes with nitric acid. Typically, those amines having at least 10 carbon atoms in the molecule are sufficiently water-immiscible to be useful. The organic solvent may be any of the compounds normally used as a diluent for amines in liquid-liquid extraction processes, such as the aliphatic hydrocarbons, aromatic solvents, aromatic petroleum fractions, ketones, nitrohydrocarbons, and chlorinated solvents. The amines and diluents described as useful in U.S. Patent No. 2,877,250, issued Mar. 10, 1959, to Keith B. Brown, David J. Crouse, Jr., and John G. Moore, for "Recovery of Uranium Values," are useful in my process.

In a system of perfect efficiency a stoichiometric quantity of amine, i.e., one mol of amine per mol of nitrate to be removed, would be sufficient; however, in plant operations using either cocurrent or countercurrent flow, 1.2 to 1.5 mols of amine per mole of initial nitrate in the feed is preferred to reduce the nitrate-to-metal ratio in the final sol to less than 0.25. There is little benefit in using more than 3 mols of amine per mol of nitrate.

Better phase separation is achieved when the organic phase is the continuous phase; consequently, in the preferred method of carrying out my invention, the organic phase is the continuous and the aqueous phase the discontinuous phase.

The ratio of nitrate to metal in the aqueous phase after this extraction step will depend not only on the extraction efficiency, but also on the ratio of thorium to other actinide values. Assuming a highly efficient contacting step, the nitrate-to-metal ratio will vary from 0.4 to 0.6 for mixtures of thorium and uranium having thorium-to-uranium ratios of 3:1 to 5:1. This nitrate content is too high to form a stable sol for sol-gel processes.

The aqueous phase, separated from the organic solution of the amine, is digested at a temperature of at least 80° C. and preferably at about 90–100° C. While some nitrate is converted to an amine-extractable form even within a short time, i.e., about 1 minute, the solution must be digested for at least 6 minutes at a temperature of 95° C. or greater in order to release enough nitrate for the resulting sol to be stable enough for sol-gel processes. Times greater than 30 minutes serve no useful purpose. During this digestion step the aqueous phase changes in color from a yellow through orange to a brilliant red sol with crystallite sizes ranging in diameter from 10 to 40 angstroms.

The aqueous sol from the digestion step is then contacted with an organic solution of an amine. While a fresh solution of either the same or a different amine may be used, the organic solution separated from the aqueous phase in the preceding step and containing nitrate can extract additional nitrate from the digested solution and its use is preferred to simplify the steps of treating and handling the organic solutions.

The step of contacting the digested aqueous solution may be carried out at room temperature by cooling the digested solution and contacting the cooled solution with the organic solution; however, in the preferred method of carrying out my invention, the hot aqueous solution is contacted with room-temperature organic solution. The elevated temperature of the resulting mixture results in faster phase separation and lower loss of any uranium present to the organic phase.

The organic phase is maintained in contact with the sol for at least about 1 minute and preferably from 2 to 10 minutes.

The extent to which nitrate is removed depends not only on factors such as the efficiency of the liquid-liquid contacting system, but also upon the uranyl-to-thorium ratio in the aqueous phase. Table I below illustrates the effect of the uranyl-to-thorium ratio on the nitrate-to-metal ratio reached in the extraction stage subsequent to digestion.

TABLE I
[Digestion conditions: 10 minutes at 98–104° C. Extraction conditions: 1.2 mol amine per mol nitrate]

| Uranium, percent: | Nitrate-to-metal ratio |
|---|---|
| 0.0 | [1] 0.29 |
| 5.0 | [1] 0.25 |
| 8.1 | 0.26 |
| 16.3 | 0.22 |
| 21.8 | 0.20 |
| 25.8 | 0.18 |
| 48.8 | 0.19 |
| 65.8 | 0.10 |

[1] These results were obtained with one additional step of digestion and extraction.

The nitrate-containing organic phase is then separated from the aqueous phase and, in order that the amine may be recycled, is transferred to a regeneration stage where the nitrate is removed by conventional methods as by contacting with an aqueous solution of sodium carbonate or ammonium hydroxide.

While the remaining steps of treating the aqueous phase do not constitute a part of my invention, a brief discussion of them will be given for a more complete understanding of the whole process. The dilute sol from the second extraction stage is evaporated to a concentration suitable for sphere formation, i.e., a concentration of 1 to 3 molar metal, and is then fed into a column containing an organic compound such as 2-ethylhexanol capable of removing water from the sol, thus forming gelled spheres, which are dried and calcined in air to yield the desired product. More details of this process are disclosed in U.S. Patent No. 3,290,122, referenced above.

Having thus described my invention, the following examples are offered to illustrate it in more detail. Example I gives details of a sol-gel process incorporating my method of making a sol.

*Example I*

Following the flowsheet of FIG. 1, an aqueous solution 1 molar in nitrate, 0.23 molar in thorium values, and 0.065 molar in uranyl values was contacted with a 0.75-molar solution of n-lauryltrialkylmethylamine in n-dodecane. Sufficient organic phase was used to provide 1.2 mols of amine for each mol of initial aqueous nitrate. Contact time in each extraction stage was 2 minutes and the temperature in each stage was about 50° C. The aqueous phase was digested for 10 minutes to 104° C. between stages. The sol produced from the second extraction stage was evaporated until it was 1.1 molar in thorium and 0.32 molar in uranium. The pH of this concentrated sol was 4.4 and the nitrate-to-metal ratio was 0.19. This concentrated aqueous solution was passed through a dehydration column containing 2-ethylhexanol to produce spherical particles. These particles were fired in air at 1150° C., and then reduced in 4 percent $H_2$—Ar for 4 hours. The resulting spheres had a density greater than 98 percent theoretical, a porosity of less than 1 percent, an oxygen-to-uranium ratio of 2.006, and a crushing strength of 1500 to 2000 grams for spheres with a diameter of 250 to 350 microns.

As can be seen from Example I, particles having excellent properties as fuel for use in nuclear reactors can be prepared from sols made in accordance with my method.

Example II is offered to show the effect of merely contacting an actinide nitrate solution without a digestion step.

*Example II*

An aqueous solution containing thorium and uranyl nitrate in a mol ratio of 3:1 was contacted for 5 minutes with an organic solution containing 1.2 mols of amine per mol of nitrate. The mol ratio of nitrate to metal in the resulting aqueous phase was 0.61.

As can be seen from Example II, one contact with an amine does not bring the nitrate level in the aqueous phase to the desired low level for preparation of a stable sol. Additional contacts do not bring the nitrate level significantly lower.

Example III below shows the effect of digesting an aqueous actinide solution which contains a stoichiometric quantity of nitrate.

*Example III*

An aqueous solution similar to that of Example II was boiled, then contacted with an organic solution of an amine at room temperature. The nitrate-to-metal ratio in the resulting aqueous solution was 0.62.

As can be seen from Example III, merely boiling a solution ocntaining a stoichiometric amount of nitrate has no significant effect on nitrate extraction.

Example IV below shows the effect of digestion time on the final nitrate-to-metal ratio achieved by my process.

*Example IV*

Aqueous solutions having the same composition as the starting solution of Example I were extracted with amine, digested, and then extracted a second time with an amine, with only the digestion times being varied. The nitrate-to-metal ratio of each solution was measured after the second extraction step. The results are given in Table II below.

TABLE II

| Digestion time, hours: | Nitrate:metal |
|---|---|
| 1 | 0.16 |
| 3 | 0.14 |
| 6 | 0.15 |
| 24 | 0.13 |

As can be seen from the data of Table II, the nitrate-to-metal ratio is changed but slightly by extending the digestion time.

Example V is offered to show the effect of digestion temperature on the metal-to-nitrate ratio achieved by my process.

*Example V*

A series of thorium-uranyl sols (3Th/U) was prepared in accordance with my process at four different temperatures using 6-minute contact periods and a 20-minute digestion period. The nitrate-to-metal ratio was measured. Each sol was then digested and extracted one more time under the same conditions. The results of these runs are given in Table III.

TABLE III

| Digestion Temperature, ° C. | Nitrate-to-Metal Ratio | |
|---|---|---|
| | After First Digestion and Extraction | After Second Digestion and Extraction |
| 80 | 0.38 | 0.34 |
| 90 | 0.30 | 0.23 |
| 95 | 0.18 | 0.17 |
| Refluxing (101–103) | 0.19 | 0.17 |

It can be seen from Table III that the amount of nitrate available for extraction increases rapidly with digestion temperature, and that a temperature of 95° C. and above is highly efficient in releasing sufficient nitrate from thorium-containing solutions to achieve a nitrate-to-metal ratio of less than 0.25.

The above examples are intended to illustrate, not to limit, my invention. It is obvious that changes in the compositions of the aqueous and organic solutions, in the time and temperature of the digestion step, and in the methods of making contacts between the aqueous and organic phases may be made without departing from my invention.

I claim:

1. A method of making an actinide sol from an aqueous actinide nitrate solution comprising reducing the nitrate content in said solution to a substoichiometric amount, digesting the resulting aqueous solution at an elevated temperature, contacting the resulting digested solution with an organic solution of an amine, and separating the resulting nitrate-containing organic phase from the resulting nitrate-depleted aqueous solution.

2. The method of claim 1 wherein said actinide nitrate solution contains thorium nitrate.

3. The method of claim 1 wherein said actinide nitrate solution contains thorium nitrate together with at least one nitrate selected from uranyl nitrate and plutonyl nitrate.

4. The method of claim 1 wherein said actinide nitrate solution contains thorium nitrate and uranyl nitrate.

5. The method of claim 1 wherein the aqueous solution containing a substoichiometric concentration of nitrate is digested at a temperature of at least 80° C.

6. The method of claim 1 wherein the aqueous solution containing a substoichiometric concentration of nitrate is digested at a temperature of at least 95° C. for at least 6 minutes.

7. The method of claim 1 wherein said actinide nitrate solution contains thorium nitrate and the nitrate-to-actinide molar ratio is reduced to a value less than 0.25.

8. The method of claim 1 wherein said nitrate content is reduced to a substoichiometric amount by contacting the aqueous actinide nitrate solution with an organic solution of an amine in a first extraction step and separating the resulting organic and aqueous phases; the aqueous solution containing a substoichiometric amount of nitrate is digested at a temperature of at least 95° C. for at least 6 minutes; and in a second extraction step the organic phase from the first extraction step and the digested aqueous phase are recombined.

References Cited
UNITED STATES PATENTS
3,256,204    6/1966    O'Connor    252—301.1

BENJAMIN R. PADGETT, *Primary Examiner.*

S. J. LECHERT, JR., *Assistant Examiner.*